(12) United States Patent
Ammerlaan et al.

(10) Patent No.: US 8,176,408 B2
(45) Date of Patent: May 8, 2012

(54) MODULARIZED WEB PROVISIONING

(75) Inventors: Michael H Ammerlaan, Sammamish, WA (US); Peter K Harwood, Snoqualmie, WA (US); Rajesh Kamath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1017 days.

(21) Appl. No.: 11/224,678

(22) Filed: Sep. 12, 2005

(65) Prior Publication Data

US 2007/0061705 A1    Mar. 15, 2007

(51) Int. Cl.
*G06N 3/00*    (2006.01)
(52) U.S. Cl. ........................................................ 715/200
(58) Field of Classification Search .................. 715/205, 715/234, 243, 254, 255
See application file for complete search history.

(56) References Cited

U.S. PATENT DOCUMENTS

| | | | |
|---|---|---|---|
| 5,325,527 A | 6/1994 | Cwikowski et al. | |
| 5,572,643 A | 11/1996 | Judson | |
| 5,586,235 A * | 12/1996 | Kauffman | 715/202 |
| 5,717,924 A | 2/1998 | Kawai | |
| 5,838,918 A | 11/1998 | Prager et al. | |
| 6,026,433 A * | 2/2000 | D'Arlach et al. | 709/217 |
| 6,093,215 A | 7/2000 | Buxton et al. | |
| 6,134,559 A * | 10/2000 | Brumme et al. | 707/103 R |
| 6,304,886 B1 * | 10/2001 | Bernardo et al. | 715/234 |
| 6,343,377 B1 | 1/2002 | Gessner et al. | |
| 6,469,714 B2 | 10/2002 | Buxton et al. | |
| 6,480,508 B1 | 11/2002 | Mwikalo et al. | |
| 6,601,057 B1 | 7/2003 | Underwood et al. | |
| 6,601,233 B1 | 7/2003 | Underwood | |
| 6,622,168 B1 | 9/2003 | Datta | |
| 6,684,369 B1 | 1/2004 | Bernardo et al. | |
| 6,691,165 B1 | 2/2004 | Bruck | |
| 6,697,825 B1 | 2/2004 | Underwood et al. | |
| 6,845,503 B1 | 1/2005 | Carlson et al. | |
| 6,910,208 B1 | 6/2005 | Zimniewicz | |
| 6,931,599 B1 | 8/2005 | Korenshtein | |
| 6,947,992 B1 | 9/2005 | Shachor | |
| 6,981,250 B1 * | 12/2005 | Wiltamuth et al. | 717/170 |
| 7,039,658 B2 | 5/2006 | Starkey | |
| 7,047,318 B1 * | 5/2006 | Svedloff | 709/246 |
| 7,047,463 B1 | 5/2006 | Organ et al. | |

(Continued)

FOREIGN PATENT DOCUMENTS

EP    0812088 A2    12/1997

(Continued)

OTHER PUBLICATIONS

Chinese Fifth Office Action in Chinese Application No. 200680019703.2, dated Nov. 23, 2011, 6 pgs.

(Continued)

*Primary Examiner* — Kyle Stork
(74) *Attorney, Agent, or Firm* — Merchant & Gould P.C.

(57) ABSTRACT

A system and method for modularized Web provisioning. Functionalities available for Web provisioning are modularized into individual feature files. A site template may reference one or more of such features. A site provisioned using the site template activates the referenced features by default. Features may be added to or removed from the site. A feature may include atomic Web provisioning elements, custom code, metadata specifying properties of the features, and/or activation dependency information specifying precedent features that need to be activated before the feature can be activated. Feature provisioning can be processed through a command-line tool, an object model, and/or a graphic user interface.

18 Claims, 6 Drawing Sheets

U.S. PATENT DOCUMENTS

| | | | |
|---|---|---|---|
| 7,058,704 | B1 | 6/2006 | Mangipudi |
| 7,152,207 | B1* | 12/2006 | Underwood et al. ......... 715/207 |
| 7,181,539 | B1 | 2/2007 | Knight et al. |
| 7,269,664 | B2 | 9/2007 | Hutsch et al. |
| 7,287,090 | B1 | 10/2007 | Berg |
| 7,448,022 | B1 | 11/2008 | Ram et al. |
| 7,493,341 | B2* | 2/2009 | Israel et al. ............................ 1/1 |
| 7,558,857 | B2 | 7/2009 | Ammerlaan et al. |
| 7,577,661 | B2 | 8/2009 | Bankston et al. |
| 7,619,761 | B2 | 11/2009 | Bankston et al. |
| 7,640,328 | B1 | 12/2009 | Lele |
| 7,979,789 | B2 | 7/2011 | Ammerlaan et al. |
| 2001/0042073 | A1 | 11/2001 | Saether et al. |
| 2002/0004824 | A1 | 1/2002 | Cuan et al. |
| 2002/0038256 | A1 | 3/2002 | Nguyen |
| 2002/0049788 | A1 | 4/2002 | Lipkin et al. |
| 2002/0069327 | A1* | 6/2002 | Chauvel ........................ 711/130 |
| 2002/0078174 | A1 | 6/2002 | Sim et al. |
| 2002/0083097 | A1 | 6/2002 | Warrington |
| 2003/0014442 | A1 | 1/2003 | Shiigi et al. |
| 2003/0074634 | A1 | 4/2003 | Emmelmann |
| 2003/0126202 | A1 | 7/2003 | Watt |
| 2003/0140143 | A1 | 7/2003 | Wolf et al. |
| 2003/0172129 | A1* | 9/2003 | Moses et al. ................... 709/219 |
| 2003/0225853 | A1* | 12/2003 | Wang et al. .................... 709/217 |
| 2004/0003266 | A1 | 1/2004 | Moshir et al. |
| 2004/0010786 | A1 | 1/2004 | Cool et al. |
| 2004/0015476 | A1 | 1/2004 | Twaddle |
| 2004/0025076 | A1 | 2/2004 | Cabrera et al. |
| 2004/0046789 | A1 | 3/2004 | Inanoria |
| 2004/0068714 | A1 | 4/2004 | Deimel et al. |
| 2004/0103073 | A1 | 5/2004 | Blake |
| 2004/0103195 | A1 | 5/2004 | Chalasani et al. |
| 2004/0103433 | A1 | 5/2004 | Regeard |
| 2004/0128618 | A1 | 7/2004 | Datta |
| 2004/0148565 | A1 | 7/2004 | Davis et al. |
| 2004/0168123 | A1* | 8/2004 | Lomelin-Stoupignan et al. .............................. 715/513 |
| 2004/0168153 | A1 | 8/2004 | Marvin |
| 2004/0205572 | A1* | 10/2004 | Fields et al. ................... 715/513 |
| 2004/0210320 | A1 | 10/2004 | Pandya |
| 2004/0216084 | A1 | 10/2004 | Brown et al. |
| 2004/0268228 | A1 | 12/2004 | Croney et al. |
| 2005/0005261 | A1 | 1/2005 | Severin |
| 2005/0015357 | A1 | 1/2005 | Shahidi |
| 2005/0015471 | A1 | 1/2005 | Zhang et al. |
| 2005/0071758 | A1 | 3/2005 | Ehrich et al. |
| 2005/0075115 | A1 | 4/2005 | Corneille et al. |
| 2005/0080891 | A1 | 4/2005 | Cauthron |
| 2005/0102284 | A1 | 5/2005 | Srinivasan |
| 2005/0138165 | A1 | 6/2005 | Tang et al. |
| 2005/0149549 | A1 | 7/2005 | Jaspers et al. |
| 2005/0187895 | A1 | 8/2005 | Paya et al. |
| 2006/0015619 | A1 | 1/2006 | Tse et al. |
| 2006/0015626 | A1 | 1/2006 | Hallamaa et al. |
| 2006/0080336 | A1 | 4/2006 | Zhang et al. |
| 2006/0129516 | A1 | 6/2006 | Bradford et al. |
| 2006/0161895 | A1 | 7/2006 | Speeter et al. |
| 2007/0061705 | A1 | 3/2007 | Ammerlaan et al. |
| 2007/0076228 | A1 | 4/2007 | Apelbaum et al. |
| 2008/0034369 | A1 | 2/2008 | Polizzi et al. |
| 2008/0120600 | A1 | 5/2008 | Deimel et al. |

FOREIGN PATENT DOCUMENTS

| | | |
|---|---|---|
| JP | 06110715 | 4/1994 |
| JP | 11003261 | 1/1999 |
| JP | 2001/075900 | 3/2001 |
| JP | 2001/273269 | 10/2001 |
| JP | 2004508616 | 3/2004 |
| RU | 2178240 C2 | 1/2002 |
| RU | 2250490 C2 | 4/2005 |
| WO | WO 01/98926 | 12/2001 |
| WO | WO 03/107147 | 12/2003 |
| WO | WO 2005/010689 | 2/2005 |
| WO | WO 2005/062201 | 7/2005 |

OTHER PUBLICATIONS

EP Communication in Application No. 06759246.9 mailed Oct. 24, 2011, 7 pgs.

Adventnet: "Distributed Mediation Guide", , Jan. 1, 2002, pp. 1-134, XP55009946, CA,USA, Retrieved from the Internet: URL: http://www.webnms.com/webnms/webnms4_help_distributed_mediation_guide.pdf, [retrieved on Oct. 19, 2011], 9 pgs.

Microsoft Corporation: "Server Clusters: Architecture Overview for Windows Server 2003", , Jan. 1, 2003, pp. 1-3, XP55009995, USA, Retrieved from the Internet: URL:http://download.microsoft.com/download/O/a/4/0a4db63c-0488-46e3-8add-28a3c0648855/ServerClustersArchitecture.doc, [retrieved on Oct. 19, 2011], 33 pgs.

"Process and Method for IT Energy Optimization," International Business Machines Corporation, Feb. 2002, Research Disclosure Database No. 454196.

"Introduction to the PlaceHolder Web Server Control" http://msdn.microsoft.com/library/default.asp?url=/library/en-us/vbcon/html/vbconplaceholderwebservercontrol.asp.

"Towards a Dynamic CORBA Component Platform"; Abstract, http://portal.acm.org/citation.cfm?id=557137.790812.

Burns et al., Efficient data distribution in a Web server farm, Jul.-Aug. 2001, IEEE, vol.5, 56-65.

Chinese First Office Action in Chinese Application No. 200680019703.2, dated May 8, 2009 issued, 16 pgs.

Chinese First Office Action in Chinese Application No. 200680019704.7, dated Oct. 23, 2009 issued, 9 pgs.

Chinese Fourth Office Action in Chinese Application No. 200680019703.2, dated Mar. 23, 2011, 6 pgs.

Chinese Notice on Grant of Patent Right for Invention in Chinese Application No. 200680019704.7, dated Oct. 13, 2010, 3 pgs.

Chinese Second Office Action in Chinese Application No. 200680019704.7, dated Aug. 4, 2010, 7 pgs.

Chinese Second Office Action issued in Chinese Application No. 200680019703.2, dated Apr. 14, 2010, 14 pgs.

Chinese Third Office Action in Chinese Application No. 200680019703.2, dated Aug. 9, 2010, 7 pgs.

Desai et al., A log(n) multi-mode locking protocol for distributed systems, Apr. 22-26, 2003, IEEE, 8 pages.

European Office Action in European Application No. 06 759 248.5, dated Apr. 2, 2009, 9 pgs.

European Search Report dated Oct. 7, 2010 for European Application No. 06 759 246.9, 4 pgs.

European Search Report in European Application No. 06 759 248.5, dated Jan. 8, 2009, 9 pgs.

Fiala et al., "Design and Implementation of Component-based Adaptive Web Presentations", ACM, SAC '04, Mar. 14-17, 2004, pp. 1699-1700.

Japanese Notice of Rejection in Application No. 2008-519287, mailed Sep. 9, 2011, 3 pgs.

Moro et al., A Version Model for Supporting Adaptation of Web Pages, ACM, WIDM '04, Nov. 12-13, 2004, pp. 123-125.

PCT International Preliminary Report on Patentability issued Jan. 9, 2008 for PCT/US2006/017586, 4 pgs.

PCT International Preliminary Report on Patentability issued Jan. 9, 2008 for PCT/US2006/017589, 6 pgs.

PCT International Search Report mailed Jul. 18, 2007 for PCT/US2006/017589, 4 pgs.

PCT International Search Report mailed Sep. 13, 2007 for PCT/US2006/017586, 3 pgs.

Russian Decision on Grant of a Patent for Invention, issued in Russian Application No. 2007147631, dated Oct. 27, 2010, 6 pgs.

Russian Notice of Allowance in RU Application 2007147644, mailed May 28, 2010, 16 pgs.

U.S. Appl. No. 11/171,617, Advisory Action mailed Jul. 14, 2008, 3 pgs.

U.S. Appl. No. 11/171,617, Amendment and Response filed Feb. 23, 2009, 10 pgs.

U.S. Appl. No. 11/171,617, Notice of Allowance mailed May 22, 2009, 9 pgs.

U.S. Appl. No. 11/172,048, Notice of Allowance mailed Jul. 2, 2009, 7 pgs.

U.S. Appl. No. 11/172,439, Advisory Action mailed May 14, 2008, 4 pgs.

U.S. Appl. No. 11/172,439, Notice of Allowance mailed Apr. 3, 2009, 16 pgs.
U.S. Appl. No. 11/311,745, Notice of Allowance mailed Apr. 28, 2011, 6 pgs.
U.S. Appl. No. 11/311,745, Notice of Allowance mailed Aug. 5, 2010, 10 pgs.
U.S. Appl. No. 11/311,745, Notice of Allowance mailed Dec. 15, 2010, 8 pgs.
U.S. Appl. No. 11/311,745, Notice of Allowance mailed Mar. 29, 2011, 10 pgs.
U.S. Appl. No. 11/171,617, Amendment and Response filed Jul. 3, 2008, 12 pgs.
U.S. Appl. No. 11/171,617, Amendment and Response filed Nov. 9, 2007, 14 pgs.
U.S. Appl. No. 11/171,617, Office Action mailed Aug. 9, 2007, 9 pgs.
U.S. Appl. No. 11/171,617, Office Action mailed Feb. 5, 2008, 11 pgs.
U.S. Appl. No. 11/171,617, Office Action mailed Oct. 23, 2008, 9 pgs.
U.S. Appl. No. 11/172,048, Amendment and Response filed Apr. 21, 2009, 12 pgs.
U.S. Appl. No. 11/172,048, Office Action mailed Jan. 21, 2009, 9 pgs.
U.S. Appl. No. 11/172,439, Amendment and Response filed Mar. 26, 2008, 18 pgs.
U.S. Appl. No. 11/172,439, Office Action mailed Aug. 5, 2008, 10 pgs.
U.S. Appl. No. 11/172,439, Amendment and Response filed Jan. 15, 2009, 14 pgs.
U.S. Appl. No. 11/172,439, Amendment and Response filed Sep. 25, 2007, 7 pgs.
U.S. Appl. No. 11/172,439, Office Action mailed Jun. 25, 2007, 9 pgs.
U.S. Appl. No. 11/172,439, Office Action mailed Nov. 27, 2007, 10 pgs.
U.S. Appl. No. 11/311,745, Amendment and Response filed Jul. 23, 2009, 18 pgs.
U.S. Appl. No. 11/311,745, Amendment and Response filed May 13, 2010, 21 pgs.
U.S. Appl. No. 11/311,745, Office Action (Final) mailed Nov. 13, 2009, 25 pgs.
U.S. Appl. No. 11/311,745, Office Action (Non-Final) mailed Mar. 20, 2009, 13 pgs.

* cited by examiner

MODULARIZED WEB PROVISIONING

BACKGROUND

Web provisioning technology has been developed to build Web sites for the Internet and/or intranets. Web provisioning generally includes selecting a site template that defines the structure and the content of a Web site. Based on the content of the site template, Web provisioning technology populates the initial page, the directories, and the site structures of the Web site. Web provisioning technology enables a user to provision multiple Web sites from a single site template. As a result, the predefined site templates enable a user to quickly create Web sites without spending much time on deciding how the sites should look or function.

Conventionally, a site template is a monolithic script describing functionalities that a Web site can provision. Different Web sites may have very different functionality requirements. For example, a Web site for an individual user may require functionalities that are quite different from a Web site for a group of users. Thus, multiple site templates may be designed for different Web sites to provision. FIG. 1 illustrates an exemplary site template 100. The site template 100 is a monolithic document containing detailed information for functionalities that a site using the site template 100 can provision. For example, the site template 100 includes default data and definitions for a Documents functionality 102, a Video Clips Library functionality 104, and a Favorite Items functionality 106. For the Documents functionality 102, the site template 100 may detail information such as document names, who can access the documents, and expiration dates of the documents. For the Video Clips Library functionality 104, the site template may detail information such as names of the video clips, locations of the video clips, metadata or metadata definitions that should apply to video clips, and sizes of the video clips, etc. For the Favorite Items functionality 106, the site template 100 may detail information such as what the items are and locations of these items. Alternatively, the site template 100 may include a self-containing set of documents detailing information for functionalities provided for sites provisioning from the site template 100.

Different site templates may contain the same or similar functionalities. For site templates such as the site template 100 that is implemented as a monolithic document including detailed information for each functionality, when a site template developer needs to use functionalities provisioned in other site templates, the developer often copies the functionalities from the other site templates. For example, if the site template that a developer is creating needs to use the Documents functionality 102 in the site template 100, the developer needs to copy all the default data and definitions for the Documents functionality 102 from the site template 100 and paste the copied information into the new site template.

Such a copy and paste approach may lead to several problems. For example, if the Documents functionality 102 in the site template 100 is updated, the Documents functionality that has been copied to the new site template would not be automatically updated. That is, changes to a functionality provided by a site template would not be automatically replicated in site templates copying the functionality from the site template.

Alternatively, a developer of a site template could also use a loosely bound, file-based linking mechanism to indirectly point at files in other site templates. This approach had the benefit of consolidating logic in a central location, i.e., the site template. However, because such linking is inherently unstructured, any change to the file structure of the other site templates would void the links and thus break any dependent site templates containing the links. Therefore, this approach of linking common entities in site templates was fragile.

In addition, in some Web provisioning platforms such as Microsoft SharePoint®, a Web site can only use provisioning information from the site template the Web site is provisioned from. The site template serves as a foundation and limits which functionalities can be added to the provisioned Web site. As a result, the Web site is constrained to the set of functionalities included in the site template. The Web site cannot be modified to support functionalities different from the functionalities provided by the site template. However, given that business requirements for a Web site may change from time to time, a Web site may evolve during its lifetime and the functionalities required for the Web site may change. The monolithic site template implementation thus limits the evolution of Web sites provisioned from a monolithic site template.

Thus, conventional Web provisioning technology uses a monolithic site template providing all detailed information of functionalities that a Web site can provision. This conventional approach allows users to quickly create Web sites without spending much time on deciding how the Web site should look. However, this conventional approach does not allow efficient modifications of functionalities that are shared by different site templates. This conventional approach also does not allow sites provisioned from a site template to evolve the functionalities the site supports after the provisioning process.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The invention addresses the above-identified limitations by modularizing functionalities provided for Web sites. These modularized functionalities are also called features. A feature includes a package of provisioning elements that work together to provide a specific functionality for a Web site. A provisioning element is an atomic unit within a feature. A site template can reference different features. A Web site can be provisioned based on the site template. Features in the Web site can then be customized to meet the specific needs of the Web site. Additional features may be added to the Web site that are not referenced by the site template. In the event that the requirements for the Web site change, features may be added to or removed from the Web site.

As a result, the invention provides a modularized site provisioning mechanism. This mechanism makes it easier to create a Web site by customizing features included in the site template that the Web site provisions and/or add new features to the Web site. Definitions for functionalities are modularized and thus sharable. Administratively, after provisioning a Web site according to a site template, an administrator can add or remove features from the site template. When requirements for a Web site change, an administrator can also reinvoke the provisioning process to customize the existing features or add new features to the Web site.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
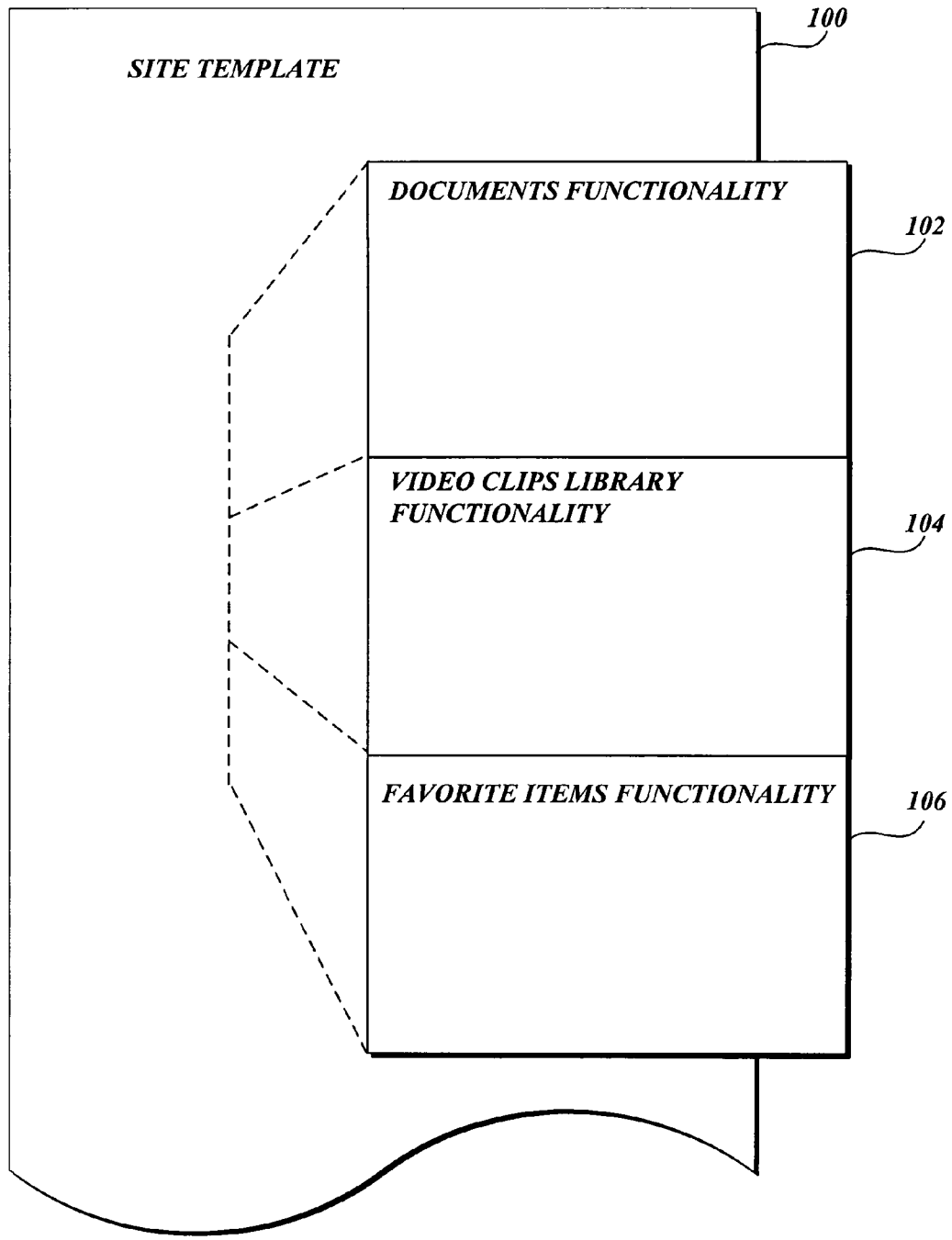
FIG. 1 is a block diagram illustrating a monolithic site template containing all information on functionalities that a site using the site template can provision.
Figure 2:
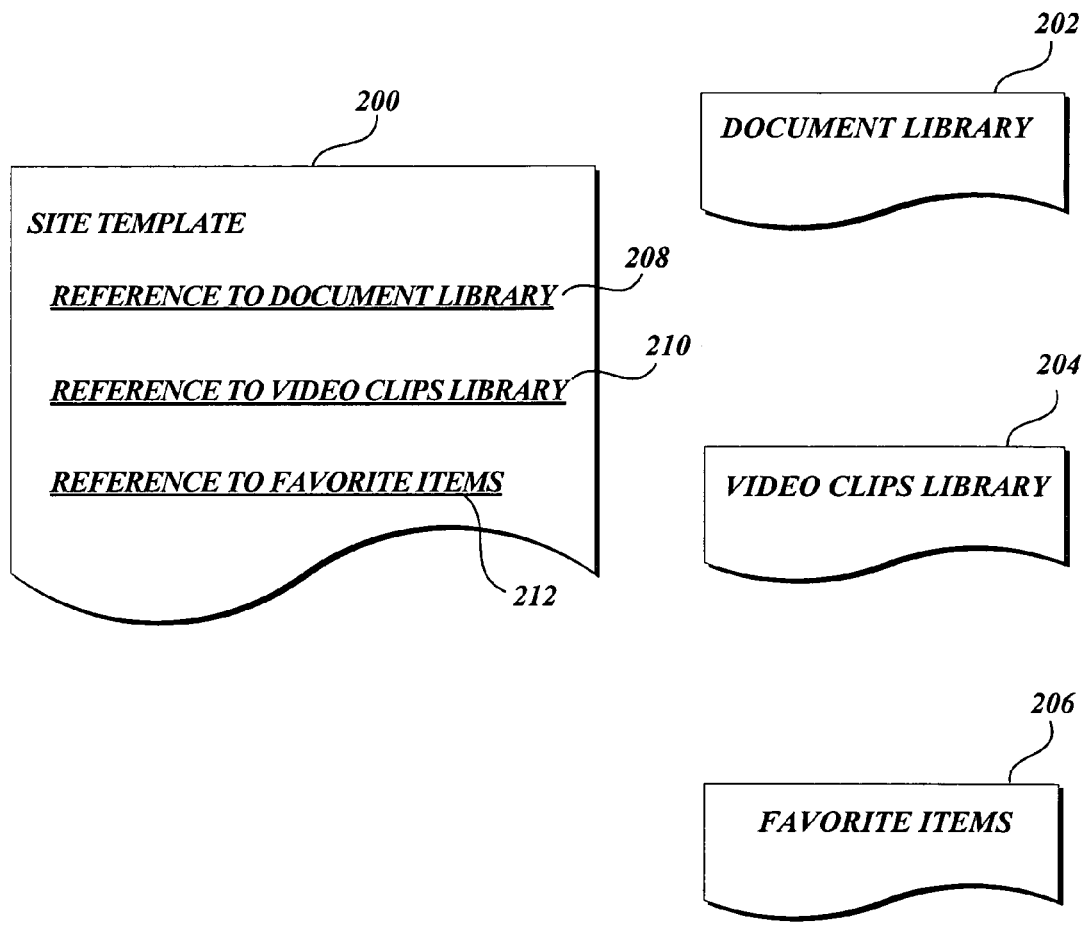
FIG. 2 is a block diagram illustrating a site template implementing aspects of the invention, wherein functionalities are modularized into features and the site template references the features.

Embodiments of the invention modularize functionalities available for different Web sites to provision. The modularized functionalities are also called features. A Web site may be created by provisioning a site template. A site template may be a package containing information to form a basic definition of a Web site. In exemplary embodiments of the invention, the package includes references to different features that a Web site may provision. FIG. 2 illustrates an exemplary site template 200 and exemplary features such as Document Library 202, Video Clips Library 204, and Favorite Items 206. The exemplary features 202-206 are modularized functionalities that can be referenced by a site template and be provisioned for different Web sites. For example, the site template 200 includes a reference 208 to the Document Library feature 202, a reference 210 to the Video Clips Library feature 204, and a reference 212 to the Favorite Items feature 206. In exemplary embodiments of the invention, a site template is portable. For example, a site template may be downloaded and uploaded to different locations by users with appropriate rights. The features referenced in a site template may be referenced by other site templates as well. Because a feature is modularized, changes to the feature will be automatically visible to all site templates referencing the feature.

Figure 3:
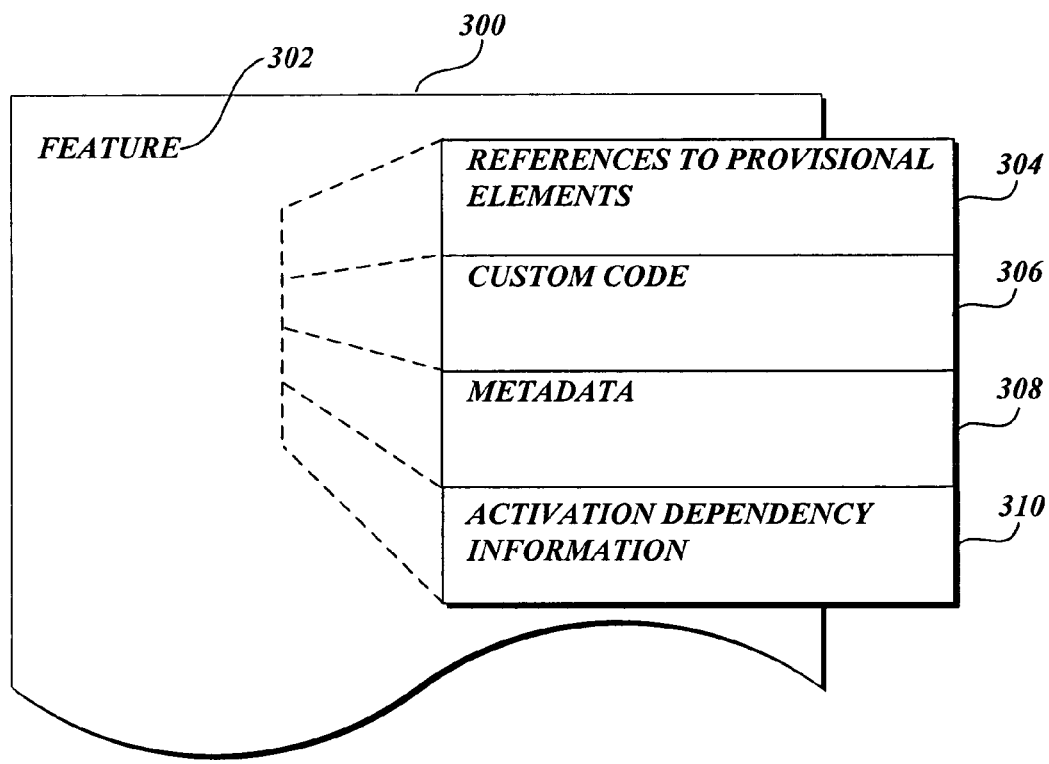
FIG. 3 is a block diagram illustrating an exemplary feature and its exemplary components.

In exemplary embodiments of the invention, a feature may be implemented as an XML file containing information that describes the feature, what its functions are, and a list of other contents. FIG. 3 illustrates an exemplary implementation 300 of a feature 302. The feature 302 contains references 304 to provisioning elements, custom code 306, metadata 308, and activation dependency information 310. In exemplary embodiments of the invention, a feature is a logical grouping of related provisioning elements designed to implement a reusable functionality for site provisioning. A provisioning element is an atomic unit within a feature. A provisional element may be a file containing one or more descriptions of various provisional entities for a Web site. Such entities can be, for example, an event handler registration, a custom action registration, or the definition of a file for provision. Essentially, a feature may be regarded as a package of provisioning elements that work together to help a user to accomplish a particular goal or task. For example, the exemplary Favorite Items feature 206 illustrated in FIG. 2 may include a custom directory element that stores, per user, a list of the user's favorite items. The feature 206 may further include a custom menu item element called "Add to Favorites." The "Add to Favorites" element may be attached to the list in the custom directory element and add a user's favorite item into the list. The Favorite Items feature 206 may further include a Web part that shows the user the top 10 favorites, preferably with a usage and link tracking to rank the favorites. Each of the three elements, by themselves, may not be usable; only when being incorporated into a single feature or being enabled all together on a Web site can they work together to become a Web solution.

Besides references 304 to existing provisioning elements, the feature 302 may further include custom code 306. The custom code 306 can provide capabilities to meet specific custom needs if existing provisioning elements do not satisfy the custom need. The custom code 306 may also be used to configure the feature 302 or other entities in or outside the feature 302.

The feature 302 may further include a set of metadata 308. The metadata 308 defines one or more properties associated with the feature 302. For example, if the feature 302 is the exemplary Document Library feature 202 illustrated in FIG. 2, the metadata 308 may include properties identifying who owns the document library. The metadata 308 may also specify that if a user is the document library owner, the user can perform privileged administrative tasks. Preferably, the metadata 308 may also specify how the feature 302 may be used. For example, the metadata 308 may specify the feature 302 can be used by five sites at any given time.

The feature 302 may further include activation dependency information 310. A feature may depend on other features. For example, the exemplary Favorite Items feature 206 may include items that link to video clips in the video Clips Library feature 204. In order for a user to use the items, the Video Clips Library feature 204 needs to be activated at first. Thus, the Favorite Items feature 206 has an activation dependency on the Video Clips Library feature 204.

In embodiments of the invention, a feature may have a specific scope. For example, features in a Web farm environment may be scoped at an individual Web site level, at a site collection level, or at the Web farm level. A feature scoped at the site collection level contains functionalities that are intended to be applied to the site collection as a whole, as well as functionalities that can be applied on a per-site basis. A feature scoped at the Web farm level is also called a global feature, which is always activated for sites in the Web farm. Such feature includes provisioning elements that are critical for implementing applications and logics for the Web farm.

As noted above, in embodiments of the invention, a site template references features. If a site template references a feature, then the provisioning of the site template activates the feature for the new site. Thus, whereas previously a site template developer needed to copy all needed functionalities into a site template, the developer now only needs to reference corresponding features containing the needed functionalities in the site template. In addition, if a site template does not reference specific features needed by a site provisioning from the site template, the specific features can be added to and activated for the site. Furthermore, an administrator of a site can also choose to deactivate features that are already included in the site. The deactivation removes the functionality provided by the features from the site. This option allows the administrator to restrict the functionalities or complexity level of a site after it has been provisioned.

Figure 4:
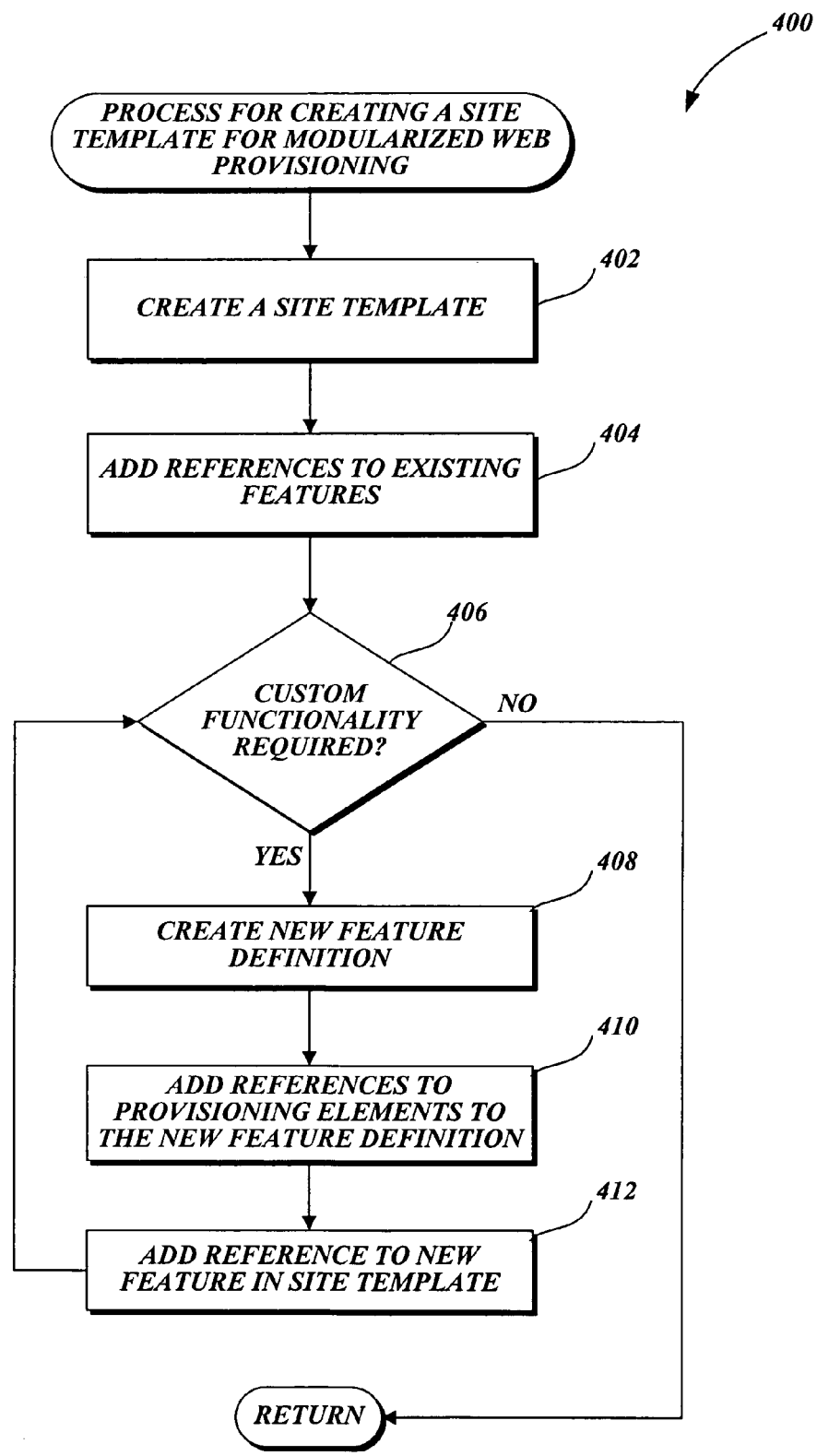
FIG. 4 is a flow diagram illustrating an exemplary process for creating a site template for modularized Web provisioning.

In exemplary embodiments of the invention, a site template developer creates a site template and references features providing the functionalities desired for the site template. FIG. 4 is a flow diagram illustrating an exemplary process 400 for creating a site template for modularized Web provisioning.

Prior to the process 400, functionalities intended for one or more Web sites have been modularized into features such as the exemplary features illustrated in FIG. 2. As noted above, each of the features is a logic unit including provisioning elements, custom code, metadata, and/or activation dependency information. Each of the features helps a user to accomplish a particular goal or task. When a site template references a feature, provisioning of the site template activates the feature for the new Web site. Different site templates can reference the same feature. Such a reference enables any change to the feature to be automatically reflected in all the site templates referencing the feature.

The process 400 starts by creating a site template such as a site template 200 illustrated in FIG. 2. See block 402. The initialization may include specifying any metadata associated with the site template. The metadata may describe what the template is for and what sites can use the template. For example, a site template may be designed for use by sales personnel while another site template may be designed to be used by customers. The process 400 then proceeds to add in the site template references to existing features. See block 404. For example, as shown in FIG. 2, references to existing features such as the Document Library feature 202, the Video Clips Library feature 204, and the Favorite Items feature 206 are added to the site template 200. The process 400 then proceeds to determine whether the site template requires custom functionality that has not been provided by any existing feature. See decision block 406. If the answer to decision block 406 is NO, the developer has finished creating a site template referencing features for Web provisioning. The process 400 terminates.

If the answer to decision block 406 is YES, meaning that the site template needs custom functionality that is not provided by existing features, the developer proceeds to create a definition for a new feature. See block 408. A feature definition defines what a feature is and may include information such as the name, type, and version of the feature. The developer then proceeds to add references to provisioning elements to the new feature definition. See block 410. The developer then adds a reference to the new feature in the site template. See block 412. At this moment, the process 400 loops back to the decision block 406 to determine whether the site template needs another custom functionality that is not provided by existing features. If the answer is YES, blocks 408-412 are repeated to create new features providing additional custom functionalities. If no new feature needs to be created, the process 400 terminates.

Figure 5:
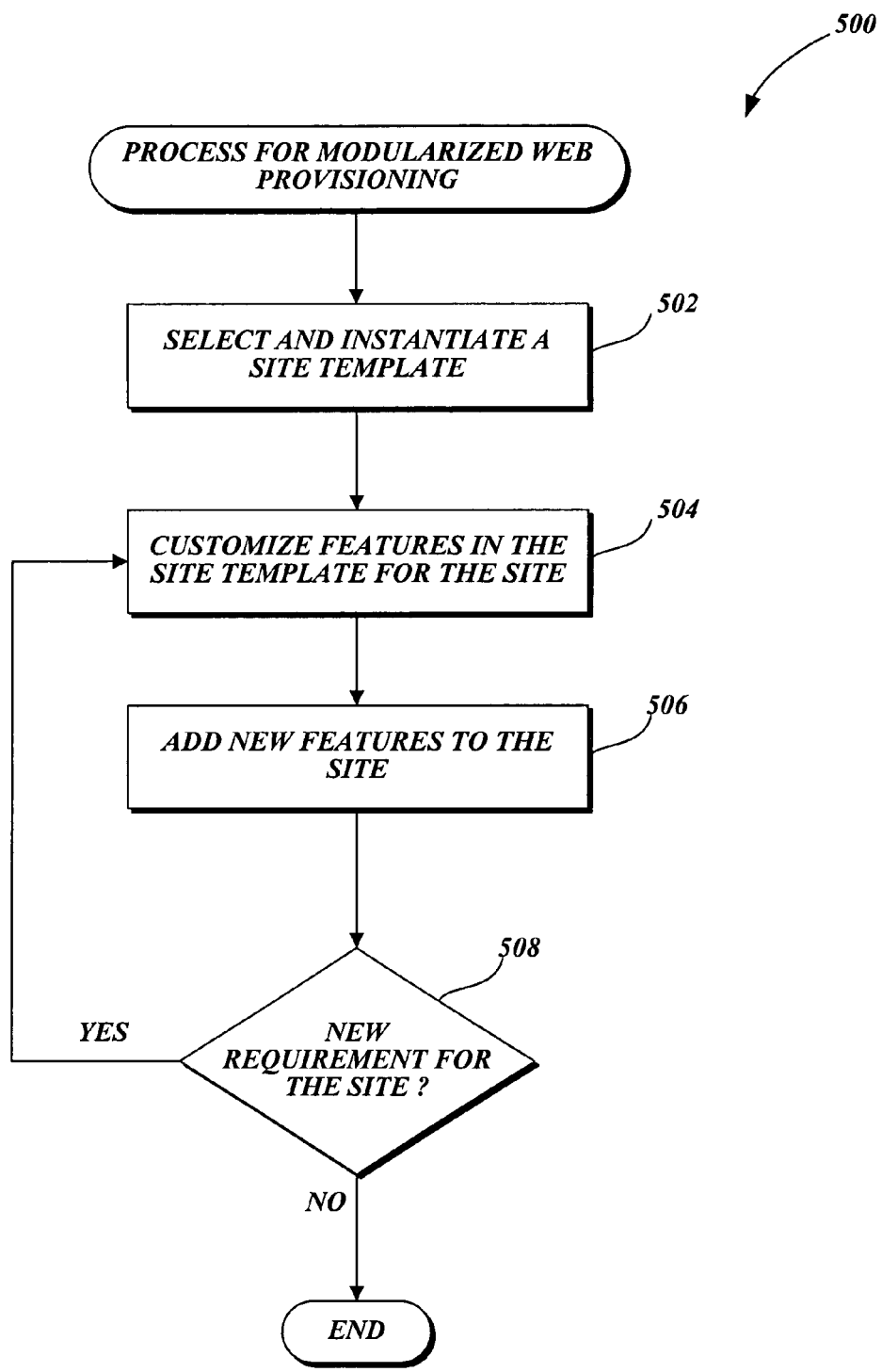
FIG. 5 is a flow diagram illustrating an exemplary process for modularized site provisioning.

FIG. 5 is a flow diagram illustrating an exemplary process 500 for modularized Web provisioning using site templates created by the exemplary process 400. The process 500 starts by selecting and instantiating a site template to build a Web site. See block 502. The instantiation of the site template activates features referenced in the site template. Optionally, the process 500 then proceeds to customize the features in the site template for the Web site. See block 504. The customization includes configuring the features referenced in the site template according to the specific requirements of the Web site. For example, the Web site may not need some of the features referenced in the site template. Such features are deactivated, i.e., being removed from the site. For a feature that has activation dependency, the process 500 recognizes such dependency and activates the one or more precedent features that the feature depends on. The process 500 may deny activation of the feature if any of its precedent features cannot be activated.

In some circumstances, the Web site may require features that are not referenced in the site template. In embodiments of the invention, an administrator of the Web site adds these features to the Web site by installing these features and activating these features for the Web site. See block 506.

Furthermore, after a Web site has been provisioned from a site template, the requirements for the Web site may change over time. For example, a Web site that is initially provisioned for marketing personnel may later expand to include sales personnel. As a result, the Web site needs to add functionalities that are suitable for the sales personnel. In such a situation, the Web site may need to be reprovisioned, e.g., features may be removed or added to the Web site to meet the new requirements for the Web site. Therefore, after provisioning a Web site, the process 500 may check, from time to time, whether there is a new requirement for the Web site. See decision block 508. If the answer to decision block 508 is YES, the process 500 loops back to block 504 to customize existing features in the Web site and/or to add new features to the Web site (block 506). If the answer to decision block 508 is NO, the process 500 does not proceed further.

In embodiments of the invention, the modularized Web provisioning process 500 can be accomplished through a command-line tool, an object model, or a graphic user interface. For example, the command-line tool may allow a user such as an administrator to display available features, to install or uninstall features, to activate or deactivate features, and/or to enumerate existing features in a Web site. An exemplary object model may include a site object for each Web site. The site object may include a feature collection object identifying all feature objects activated for the Web site. Each feature object may include a set of properties that contain metadata for the feature. Each feature object may also include a feature definition object containing the base definition of the feature such as what the feature is, and the name, type, and version of the feature. The feature collection object may further include methods that allow a user to add a feature object to the site object. The addition activates the feature for the site. The feature collection object may also include methods for removing a feature object from the collection object. The removal is equivalent to deactivating the feature from the site. The object model may include other objects and their associated data and methods for facilitating the modularized Web provisioning process 500.

Figure 6:
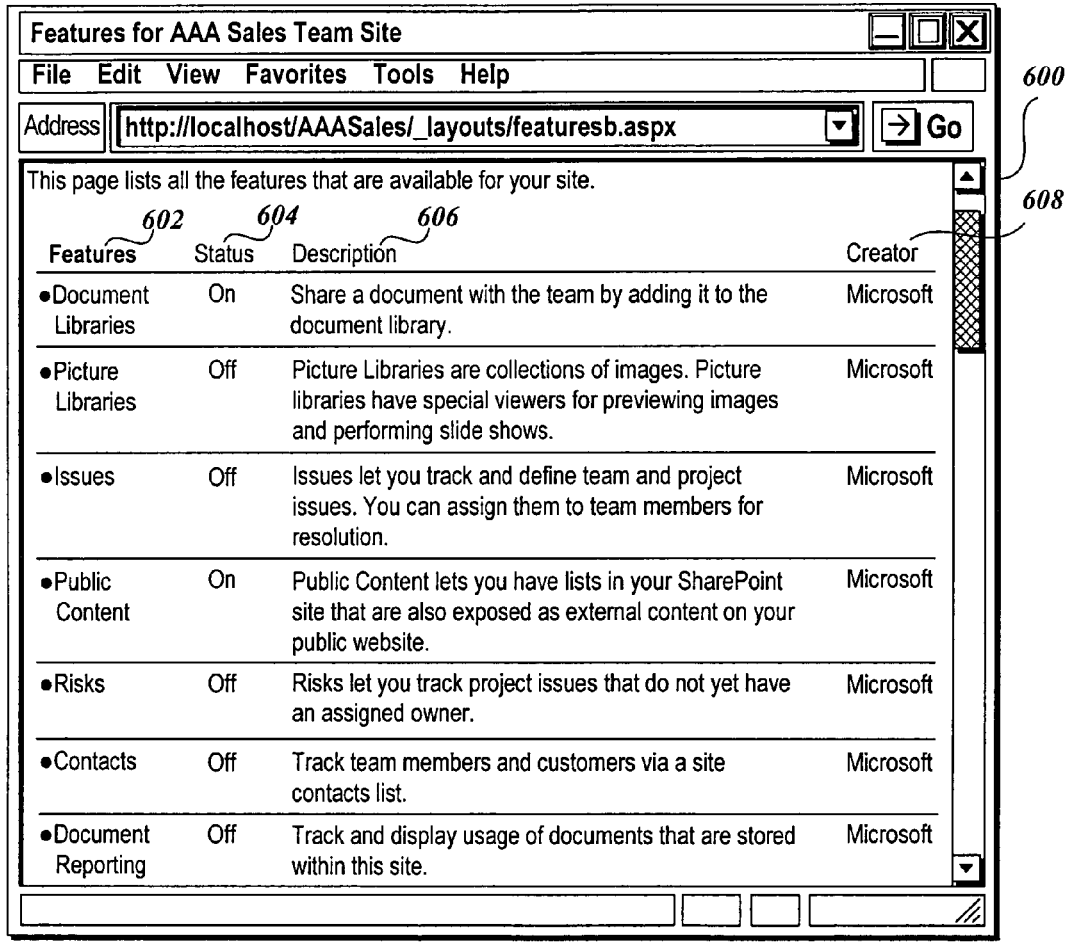
FIG. 6 is a pictorial diagram illustrating an exemplary user interface for customizing features for a site instantiated from a site template.

Preferably, information for the modularized Web provisioning process 500 can also be received through a graphic user interface. For example, FIG. 6 illustrates an exemplary Web page in an exemplary user interface 600 where features available for a Web site are displayed. The user interface 600 allows an authorized user such as an administrator of the site to configure the features, such as to activate or deactivate the features. As shown in FIG. 6, a list of features 602 that are currently available to the site is displayed. Their corresponding statuses 604 indicate whether each of the features is activated ("On") or deactivated ("Off"). The user interface 600 may also provide a description 606 for each of the features 502. The creator 608 of each of the features 602 may also be displayed. Preferably, the user interface 600 may also allow an authorized user to configure new features added to the site.

In some embodiments of the invention, a feature may also include metadata specifying where and how the feature may be used. An administrator can thus use the user interface 600 to restrict the behavior of the feature accordingly. For example, an administrator can configure the properties of the feature to restrict its availability to only specific sites. For instance, only product marketing and sales sites may have the access to features that expose corporate sales data. Meanwhile, a developer of a feature could configure the metadata of the feature so that the feature can only be activated if certain licensing provisions have been met; e.g., the licensing provision may only allow a feature to be in use on five sites at a given time. As a result, modularizing functionalities for Web provisioning enables flexible and efficient administration of a Web provisioning process.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method for modularized Web provisioning within a Web farm that includes at least one site collection that further includes a plurality of Web sites, the method comprising:
    modularizing a plurality of functionalities into a plurality of features available for Web site provisioning, wherein each feature comprises a package of one or more provisioning elements that are integrated to provide a specific functionality for support by a Web site, wherein each specific functionality comprises performing one or more tasks to provide a Web solution, and wherein at least one of the features comprises metadata specifying a limitation on how the at least one of the features may be used;
    applying a scope to each of the features, wherein the at least one of the features comprises a Web-farm-level scope that requires the Web-farm-level-scoped feature to be included in all Web sites in the Web farm;
    creating a plurality of site templates for Web site provisioning;
    adding, in a first site template of the plurality of site templates, a first reference to a first feature of the plurality of features, wherein the first feature corresponds to a first Web solution, and wherein the adding a first reference to a first feature occurs by indicating that a status of the first feature for the first site template is activated;
    adding, in a second site template of the plurality of site templates, a second reference to the first feature of the plurality of features, wherein the second site template is different from the first site template, and wherein the adding a second reference to the first feature occurs by indicating that a status of the first feature for the second site template is activated;
    instantiating the first site template of the plurality of site templates to build a first Web site, wherein the instantiating activates the first feature referenced in the first site template if the first feature is activated in the first site template, and wherein activating the first feature causes the first Web solution to be available on the first Web site;
    instantiating the second site template of the plurality of site templates to build a second Web site, wherein the instantiating activates the first feature referenced in the second site template if the first feature is activated in the second site template, and wherein activating the first feature causes the first Web solution to be available on the second Web site;
    checking for a new Web site requirement, the new Web site requirement comprising the addition or removal of a feature of the plurality of features; and
    reprovisioning the Web site based on the new Web site requirement.

2. The method of claim 1, further comprising:
    creating a new feature for a functionality that is not provided by the plurality of features but is required by the first site template; and
    referencing the new feature in the first site template.

3. The method of claim 1, further comprising:
    customizing a second feature referenced in the first site template.

4. The method of claim 1, further comprising:
    adding a third feature of the plurality of features to the first Web site that is not referenced by the first site template but is needed by the first Web site.

5. The method of claim 1, wherein the modularized Web provisioning is accomplished through one or more from the group consisting of: a graphic user interface, an object model, and a command-line tool.

6. A Web provisioning system within a Web farm that includes at least one site collection that further includes a plurality of Web sites, the system comprising:
    a computing device comprising at least one processor and at least one memory, wherein the at least one processor and the at least one memory are communicatively arranged to:
        modularize a plurality of functionalities into a plurality of features available for Web site provisioning, wherein each feature comprises a package of one or more provisioning elements that are integrated to provide a specific functionality for support by a Web site, wherein each specific functionality comprises performing one or more tasks to provide a Web solution, and wherein at least one of the features comprises metadata specifying a limitation on how the at least one of the features may be used;
        apply a scope to each of the features, wherein the at least one of the features comprises a Web-farm-level scope that requires the Web-farm-level-scoped feature to be included in all Web sites in the Web farm;
        create a plurality of site templates for Web site provisioning;
        add, in a first site template of the plurality of site templates, a first reference to a first feature of the plurality of features, wherein the first feature corresponds to a first Web solution, and wherein the adding a first reference to a first feature occurs by indicating that a status of the first feature for the first site template is activated;
        add, in a second site template of the plurality of site templates, a second reference to the first feature of the plurality of features, wherein the second site template is different from the first site template, and wherein the adding a second reference to the first feature occurs by indicating that the status of the first feature for the second site template is activated;
        instantiate the first site template of the plurality of site templates to build a first Web site, wherein the instantiating activates the first feature referenced in the first site template if the first feature is activated in the first site template, and wherein activating the first feature causes the first Web solution to be available on the first Web site;
        instantiate the second site template of the plurality of site templates to build a second Web site, wherein the instantiating activates the first feature referenced in the second site template if the first feature is activated in the second site template, and wherein activating the first feature causes the first Web solution to be available on the second Web site;

check for a new Web site requirement, the new Web site requirement comprising the addition or removal of a feature of the plurality of features; and reprovision the Web site based on the new Web site requirement.

7. The system of claim 6, wherein a change to the first feature is automatically reflected in the first and second site templates referencing the first feature.

8. The system of claim 6, wherein the plurality of features are defined in XML format.

9. The system of claim 6, wherein one of the plurality of features comprises one or more atomic units providing a specific functionality for a Web site.

10. The system of claim 6, wherein one of the plurality of features comprises one or more references to custom code.

11. The system of claim 10, wherein the custom code is used to configure an entity other than the feature itself.

12. The system of claim 6, wherein the metadata defines one or more properties associated with the at least one of the features.

13. The system of claim 6, wherein one of the plurality of features comprises activation dependency information identifying one or more of the plurality of features that need to be activated before activation of the feature.

14. The system of claim 6, wherein at least a second one of the features comprises one or more from the group consisting of: a site collection scope, wherein the associated feature is applied to a collection of sites; and a site scope, wherein the associated feature is only applied to an individual site.

15. A computer storage medium not consisting of a propagated data signal storing a set of instructions which when executed performs a method for modularizing Web provisioning within a Web farm that includes at least one site collection that further includes a plurality of Web sites, the method comprising:

modularizing a plurality of functionalities into a plurality of features available for Web site provisioning, wherein each feature comprises a package of one or more provisioning elements that are integrated to provide a specific functionality for support by a Web site, wherein each specific functionality comprises performing one or more tasks to provide a Web solution, and wherein at least one of the features comprises metadata specifying a limitation on how the at least one of the features may be used;

applying a scope to each of the features, wherein the at least one of the features comprises a Web-farm-level scope that requires the Web-farm-level-scoped feature to be included in all Web sites in the Web farm;

creating a plurality of site templates for Web site provisioning;

adding, in a first site template of the plurality of site templates, a first reference to a first feature of the plurality of features, wherein the first feature corresponds to a first Web solution, and wherein the adding a first reference to a first feature occurs by indicating that a status of the first feature for the first site template is activated;

adding, in a second site template of the plurality of site templates, a second reference to the first feature of the plurality of features, wherein the second site template is different from the first site template, and wherein the adding a second reference to the first feature occurs by indicating that a status of the first feature for the second site template is activated;

instantiating the first site template of the plurality of site templates to build a first Web site, wherein the instantiating activates the first feature referenced in the first site template if the first features is activated in the first site template, and wherein activating the first feature causes the first Web solution to be available on the first Web site;

instantiating the second site template of the plurality of site templates to build a second Web site, wherein the instantiating activates the first feature referenced in the second site template if the first feature is activated in the second site template, and wherein activating the first feature causes the first Web solution to be available on the second Web site;

checking for a new Web site requirement, the new Web site requirement comprising the addition or removal of a feature of the plurality of features; and reprovisioning the Web site based on the new Web site requirement.

16. The computer storage medium not consisting of a propagated data signal of claim 15, further comprising:

creating a new feature for a functionality that is not provided by the plurality of features but is required by the first site template; and referencing the new feature in the first site template.

17. The computer storage medium not consisting of a propagated data signal of claim 15, further comprising:

customizing a second feature referenced in the first site template.

18. The computer storage medium not consisting of a propagated data signal of claim 15, further comprising:

adding a third feature of the plurality of features to the first Web site that is not referenced by the first site template but is needed by the first Web site.

* * * * *